Figure 4:
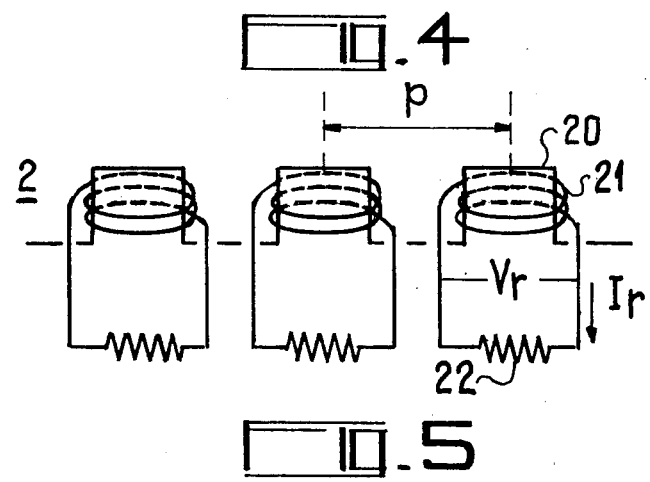

United States Patent [19]

Mourier

[11] 4,189,654
[45] Feb. 19, 1980

[54] ELECTRICAL MACHINE OPERATING AS A GENERATOR OR AS AN AMPLIFIER

[75] Inventor: Georges Mourier, Paris, France
[73] Assignee: Thomson-CSF, Paris, France
[21] Appl. No.: 737,280
[22] Filed: Nov. 1, 1976
[30] Foreign Application Priority Data
　　Nov. 7, 1975 [FR] France ............................ 75 34160
[51] Int. Cl.² ............................................. H02K 11/00
[52] U.S. Cl. ..................................... 310/72; 310/103; 318/797
[58] Field of Search .................. 310/103, 72, 211, 166, 310/172, 168; 318/220 R, 238

[56] References Cited
U.S. PATENT DOCUMENTS

| | | | |
|---|---|---|---|
| 911,147 | 2/1909 | Mershon | 310/211 X |
| 2,608,623 | 8/1952 | Cutler et al. | 310/103 X |
| 2,706,269 | 4/1955 | Kazan | 310/72 X |
| 3,875,484 | 4/1975 | Williams et al. | 318/220 R |

Primary Examiner—Donovan F. Duggan
Attorney, Agent, or Firm—Roland Plottel

[57] ABSTRACT

The invention relates to an electrical machine. The stator 1 is a delay line, in the form of a low-pass filter in the example, formed by inductance 11 and capacitors 12 connected between these inductances and the common conductor 13. The rotor 2 comprises dissipating elements 22 incorporated in circuits 26, separate in the example, and having a common point 25. It is put in movement by a motor. The machine operates as a high-gain amplifier having a wide band of high-frequency signals applied to the input 14 of the stator, separated from the output 15 by the decoupling zone 30. High powers are obtainable.

Application to installations for testing vibration of industrial equipment and to high-power longwave radio transmission.

6 Claims, 9 Drawing Figures

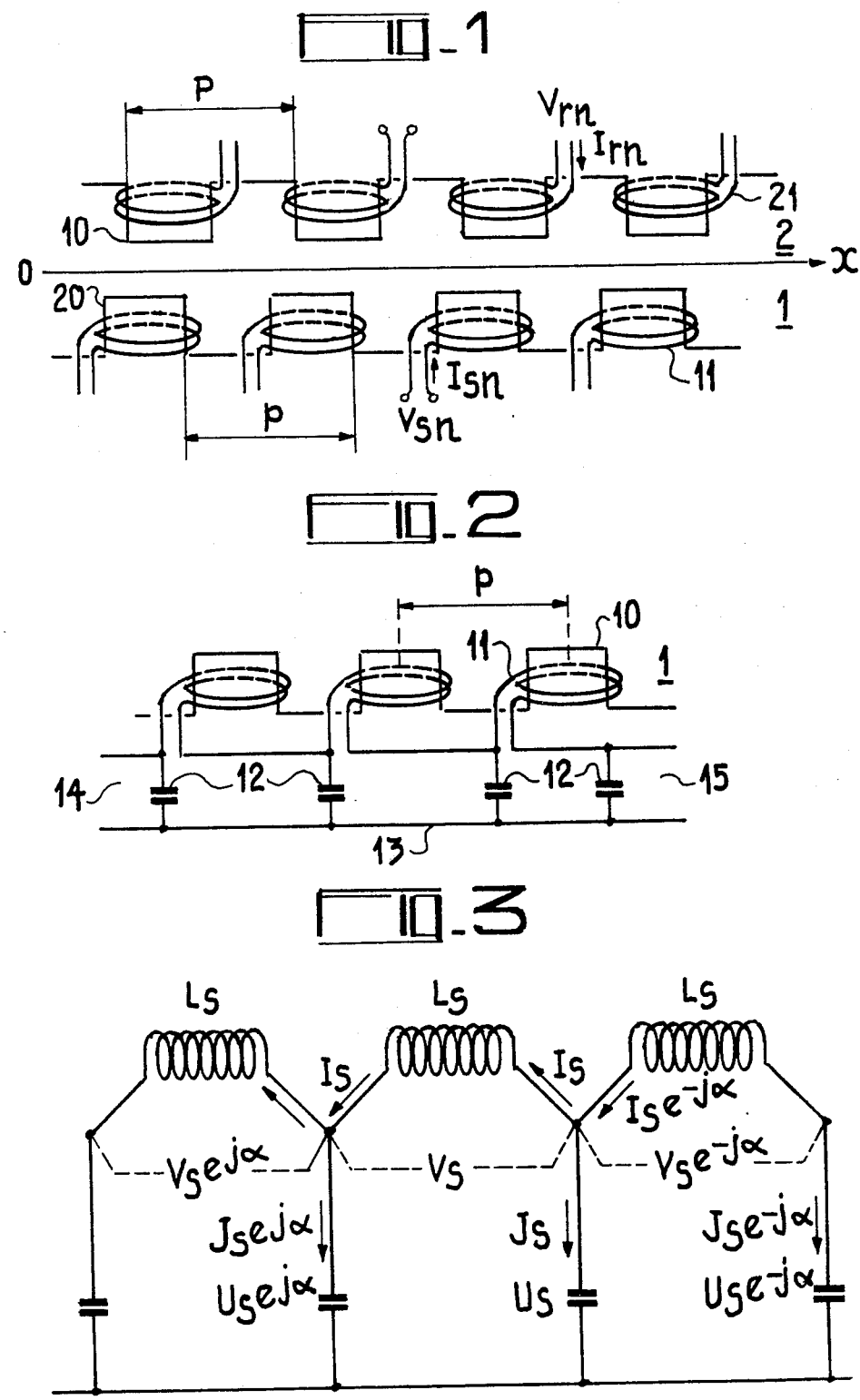

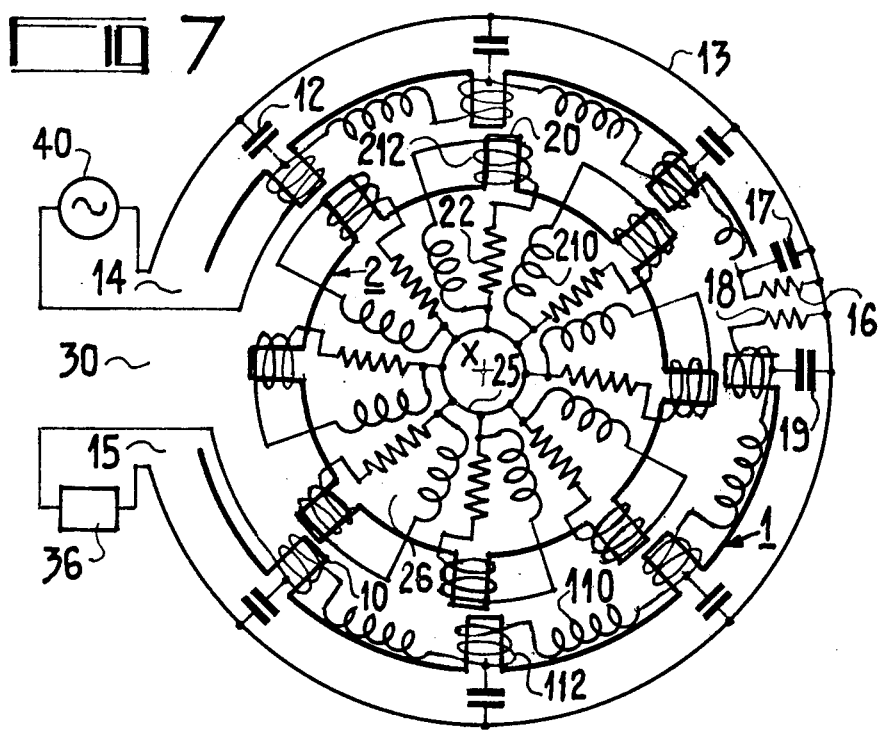
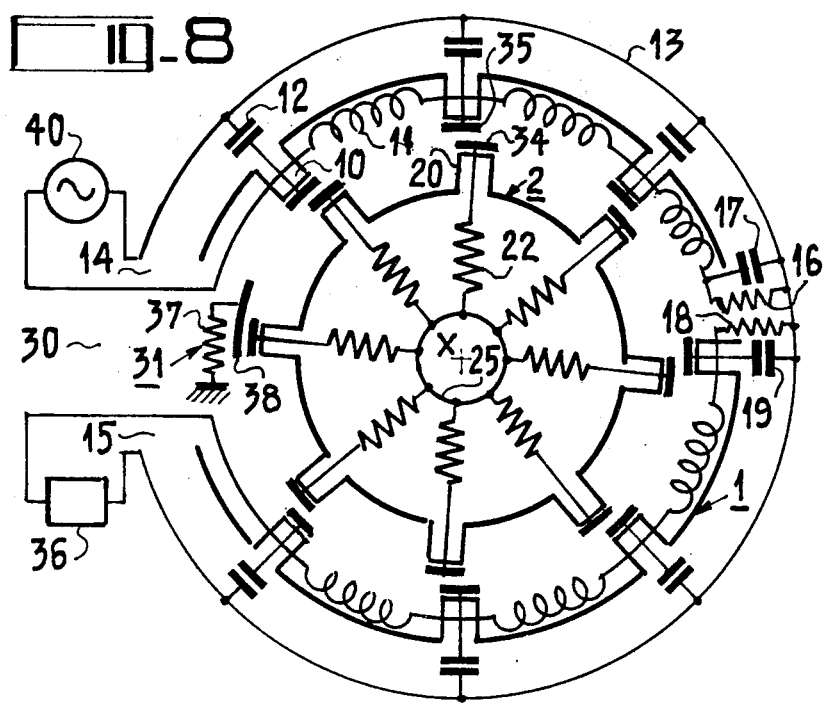

ELECTRICAL MACHINE OPERATING AS A GENERATOR OR AS AN AMPLIFIER

The invention relates to an electrical machine capable of operating as a generator and as an amplifier.

The machine comprises a fixed part, or stator, in which moves a moving part designated hereinafter by the term rotor, by analogy with the case of machines of the prior art in which the movement in question is a movement of rotation, although this movement may be other than a rotation and in particular a rectilinear translation in the case of the invention.

The stator of the machine of the invention consists of a line having two conductors which have two input terminals and two output terminals; its rotor comprises resistive elements under conditions which will be described in detail hereinafter.

In operation, a wave is propagated between the input terminals and the output terminals in question in this line.

Electrical machines are known from U.S. Pat. No. 3,875,484, in which the stator comprises inductances and capacitances incorporated in a transmission line, as in the machines of the invention, along which there is propagated in operation an electric wave, but, contrary to the case of the invention, this line has only one pair of terminals to which those of the alternating current source are connected. The application of the voltage of this source between these terminals causes the rotation of the rotor of the machine which, as it is operating as a motor, does not have an output. Owing to the structure a brief indication of which has been given above, the machine of the invention is intended, on the contrary, to operate as a generator or as an amplifier; it has an output constituted by the other pair of terminals of the stator, the rotor being driven by an exterior motor.

Figure 5:
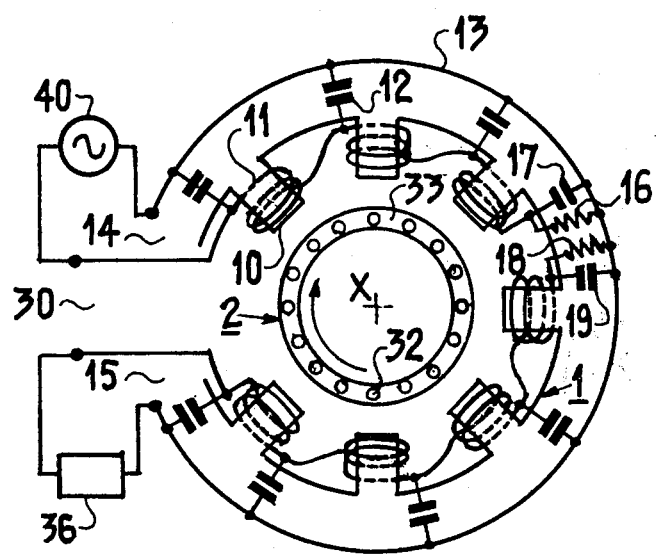
Figure 6:
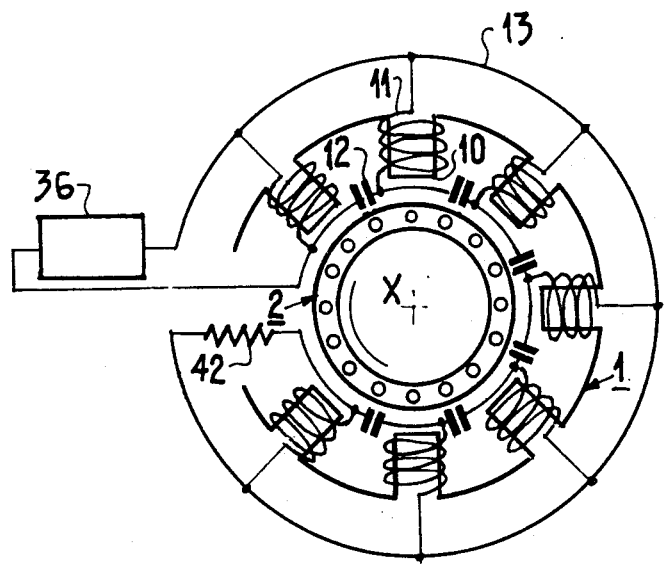
Figure 9:
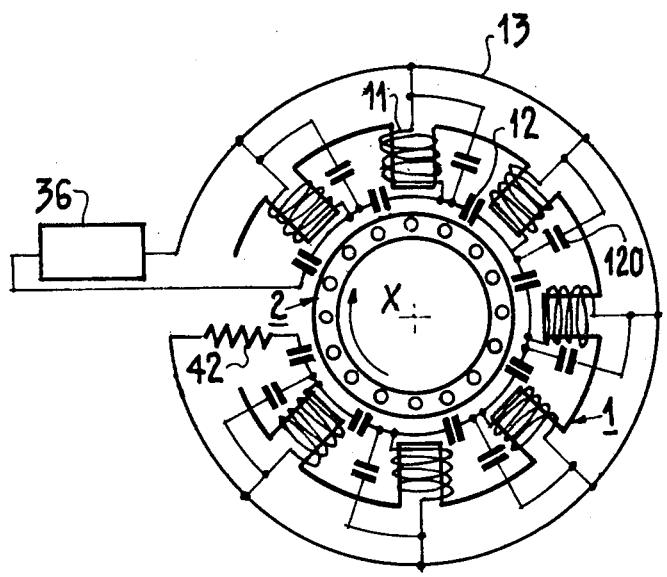

A better understanding of the invention will be had from the ensuing description with reference to the accompanying Figures which represent:

FIG. 1, diagrammatically, the stator assembly and the rotor of a machine to which the invention is applied;

FIGS. 2 and 3, diagrammatically, an embodiment of an electrical circuit of the stator of a machine of the invention and the corresponding diagram;

FIG. 4, diagrammatically, a rotor structure of the machines of the invention;

FIG. 5, a diagrammatic view of a variant embodiment of the machine of the invention having a stator according to the design of FIG. 2;

FIGS. 7 and 8, diagrammatic views of two variant embodiments of the machine of the invention operating as amplifiers;

FIGS. 6 and 9, two modifications of the machine of the invention operating as generators.

FIG. 1 shows diagrammatically a machine structure to which the invention is applied, in which the stator 1 and the rotor 2 comprise poles aligned in the direction ox along which occurs, in operation, the displacement of the rotor. These poles carry respectively the references 10 and 20 and are repeated with the same spatial periodicity or pitch p in the two parts of the machine. The references 11 and 21 designate the inductive windings through which the coupling occurs between a pole of the rotor and a pole of the stator when they are placed in confronting relation in the course of the movement, in operation, of the rotor in front of the stator, $V_{sn}$ and $V_{rn}$ the instantaneous values of the voltages at the terminals of these windings, and $I_{sn}$ and $I_{rn}$ those of the currents therein at the moment of this coupling, n designating the rank of the pole in each part of the machine. Hereinafter, in order to simplify the notations, this index will be voluntarily omitted in the expression of the voltages and currents in question. $\phi$ designates the magnetic flux and M the coefficient of mutual inductances of this coupling. There are then obtained the following known equations:

$$\phi_s = L_s I_s + M I_r \tag{1}$$
$$\phi_r = M I_s + L_r I_r \tag{2}$$
$$V_s = j\omega L_s I_s + j\omega M I_r \tag{3}$$
$$V_r = j\omega' M I_s + j\omega' L_r I_r \tag{4}$$

wherein $L_s$ and $L_r$ designate the values of the inductances 11 and 21 and $\phi_s$ and $\phi_r$ the magnetic flux in these windings.

The quantities $\omega$ and $\omega'$ designate, in these equations, the angular frequencies of the currents in the stator and rotor respectively; $\omega = 2\pi f$, wherein f designates the corresponding frequency. For equal phase differences between two successive poles of the stator and rotor, the pulsations $\omega$ and $\omega'$ in question are related by the relation:

$$\omega' = \omega - \beta u \tag{5}$$

wherein $\beta$ is in accordance with the usual definition the constant of propagation of the magnetic field wave along the stator and u the speed at which the rotor moves in front of the stator in the direction of the reference axis ox in the case of the machine of the embodiment of FIG. 1.

$$\beta = \frac{2\pi}{\Lambda} = \frac{\omega}{v_\phi}$$

if $\Lambda$ and $v_\phi$ respectively designate the wavelength and the phase velocity in the stator.

In the embodiment of the machine of the invention exhibiting a stator in the form of a low-pass filter transmission line with an input 14 and an output 15, which machine is constituted by associating with the forgoing inductances 11 charge accumulating elements 12 mounted between these inductances and a common conductor 13 in accordance with the diagrammatic view of FIG. 2 and the diagram of FIG. 3, there is added to the foregoing equations the following equation:

$$\frac{V_s}{I_s} = -\frac{2}{jC_s\omega}(1 - \cos\alpha) \tag{6}$$

wherein $\alpha$ is equal to $\beta p$ and $C_s$ designates the value of the capacitors 12 (FIG. 2) included in the constitution of the filter in question, it being observed that there is obtained with the notations of FIG. 3:

$$I_s = \frac{-J_s}{1 - \exp(-j\alpha)} \text{ and}$$

$$V_s = U_s(1 - \exp(j\alpha)), \text{ with } U_s = -j\frac{J_s}{C_s\omega}$$

There is also added thereto the equation (7) $V_r + R_r I_r = 0$, for a rotor constituted, as indicated in FIG. 4, by separate resistive circuits each of which comprises, in addition to the foregoing coupling inductance 21, a resistor 22 of value $R_r$.

By eliminating the magnitudes of flux, voltage and current between the homogeneous equations (1), (2), (3), (4), (6) and (7) and by replacing $\omega'$ by its expression taken from equation (5), there is obtained an equation in $\beta$ whose roots have an imaginary part, whence it results that the variation with respect to time of the wave propagated along the stator in the direction ox of FIG. 1, whose amplitude is proportional, in accordance with the conventional notation, to $\exp j(\omega t - \beta x)$, undergoes an amplification in the course of this propagation.

The equation in question is:

$$(\beta - \frac{\omega}{u} + \frac{j}{u\frac{L_r}{R_r}})(\beta^2 - \beta^2{}_1) = j \frac{\beta^2{}_1}{u\frac{L_r}{R_r}} \frac{\frac{M^2}{L_rL_s}}{1 - \frac{M^2}{L_rL_s}} \quad (8)$$

(with $$\beta^2{}_1 = \omega^2 C_s L_s \frac{1}{p^2}(1 - \frac{M^2}{L_4L_s})$$

and assuming $\alpha$ small, that is to say that the machine has a large number of phases in the electrotechnical sense of the word, the roots of which will be calculated by their relative difference z from a reference value chosen to be equal to $\omega/u$, which is but little different, under the conditions of operation of the machines of the invention, from the quantity $\beta_1$ defined here inbefore; there is obtained:

$$z = \frac{\beta - \beta_1}{\beta_1} \text{ and } \beta = \beta_1(1 + z) \quad (9).$$

The foregoing ratio $\omega/u$ is no other than the value of $\beta$ in synchronous machines, in which $\omega'$ is null (formula 5). In the machines of the invention $\omega'$ is different from zero: these machines operate in the asynchronous manner.

The equation in z is written:

$$z^2 + 2j\gamma z - j\gamma = 0 \quad (8')$$

in the particular case of a coupling coefficient $$\mu = \frac{M^2}{L_rL_s} de \frac{1}{2}.$$

It has two roots having an imaginary part. The machine is capable of amplifying a signal applied to the input of the stator. The order of magnitude of this amplification is given hereinafter in an example. The expression of these roots is:

$$z\pm = -j\gamma \pm j\sqrt{\gamma^2 - j\gamma} \quad (10)$$

with:

$$z\pm = -j\gamma \pm j\sqrt{\gamma^2 - j\gamma} \quad (10)$$
$$= \frac{R_r}{L_r} \frac{1}{2u\beta_1}.$$

to which the following numerical values correspond for a certain number of values of $\gamma$. The amplified wave corresponds to the root $Z+$.

| | 0.01 | 0.03 | 0.1 | 0.3 | 1 |
|---|---|---|---|---|---|
| z+ | 0.0703 + 0.610 | 0.120 + j0.094 | 0.212 + j0.135 | 0.334 + j0.149 | 0.455 + j0.098 |

The gain g in power per unit length of the stator is, according to (9):

$$g \text{ db/m} = 8.7\beta_1 \cdot (\text{imaginary part of } z).$$

In the given example, this gain reaches it maximum value for the wave corresponding to $z+$, for $\gamma$ between 0.1 and 0.3. The imaginary part of z is then in the neighbourhood of 0.15, which gives for g, in respect of a stator whose length is 5 wavelengths (x=5), about 40 decibels. It will be observed that the corresponding propagation constant $\beta$ differs but slightly in absolute value from the constant $\omega/u$ corresponding to synchronous operation. The machine of the invention operates under conditions which differ but slightly from synchronous operation conditions.

The wave passing through the stator is amplified in the manner of an electromagnetic wave which is propagated along the delay line of wave propagating tubes employed in hyperfrequency described, among others, by J. R. Pierce in "Traveling Wave Tubes", Van Nostrand Co, 1950. The amplification occurs, as for these tubes, in a wide band around the central frequency.

In the foregoing, the rotor has been represented, for ease of description, with a structure having poles (reference 20 in the Figures). With the scope of the invention the rotor in question could be in the form of the well-known squirrel-cage structure of asynchronous machines. The foregoing calculations remain valid in giving to the notion of resistance and to the notion of inductance the signification they have in this case.

The foregoing properties have been established by means of simplifying hypotheses which permit a clearer presentation. These properties apply generally to all machines whose stator and rotor would have the indicated electrical structure, even in the case of an operation which would slightly differ from these hypotheses in the neighbourhood of synchronous frequency. Moreover, the case was considered of a coupling by inductance between the rotor and the stator with a mutual coefficient M. Within the scope of the invention, this coupling could also be of an electrostatic nature between the conductors of the stator and rotor; similar equations would be obtained by substituting for the coefficient M the coefficient of electrostatic influence between the conductors in question, for the quantity $L_r$ that, $C_r$, of the capacitance of each circuit of the rotor and, after interversion between $L_s$ and $C_s$. In this case $V_r$ (equation 7) represents the voltage drop at the terminals of the capacitance of the rotor.

The machine of the invention is also capable of operating as a generator, as will be seen hereinafter.

A few embodiments of the structure of the machine of the invention will be given hereinafter.

FIG. 5 shows a first modification of this structure comprising a stator in accordance with the low-pass filter diagram of FIG. 2. The rotor is a squirrel-cage, the reference numerals 32 and 33 of which designate the bars and the end faces. In operation, it is driven by a rotor (not shown) which drives it in rotation in the direction of the arrow about the a x i x X which is common to the rotor and the stator of the machine. Applied to the input 14 of the stator, in operation, is a source of alternating voltage 40 and applied to the output 15 is a load 36 the impedance of which is equal to the characteristic impedance of the line of which the stator is part. In this arrangement of revolution about the axis X, a decoupling zone 30 separates the input and output of the stator. Further, in this zone, and in order to avoid any risk of coupling between input and output of the stator by the circuits of the rotor, there is provided any damping device considered necessary, an embodiment of which is given hereinafter.

The different elements of the filter constituting the stator are damped by the resistors 16, 18 which are connected as shown in the Figure between the windings 11 and the conductor 13 common to the terminals of the capacitors 17 and 19.

Such a machine operates as an amplifier of the signal applied to the input of the stator with a gain which is of the order of 40 db in the numerical example given hereinbefore.

Such machines may be used as supply sources for high-power vibrators for the testing of industrial equipment of all kinds. They have the advantage over presently-known installations of this type of avoiding the steep leading edges and the high frequencies which result in their spectrum. Output powers of 100 kw may be obtained with 10 w applied at the input, with frequencies ranging up to 50 kHZ.

The same machine may be applied as a high-power amplifier in radio broadcasting.

FIGS. 7 and 8 give two other modifications of the arrangement of the circuits of the rotor in which the same reference numerals designate the same elements as in the preceding Figures. In one of them (FIG. 8), the coupling between the rotor and stator is of electrostatic nature. It occurs between the conductors 34 and 35 when the latter are in confronting relation in the course of the displacement of the rotor. In FIG. 7, 110 and 112 designate the two constituent parts of the self-inductances associated with each one of the poles 10 of the stator, and 210 and 212 the parts of the self-inductances of each pole 20 of the rotor. In both Figures, 25 designates a common conductor and 26 all of the elements associated with each pole of the rotor. In the modification of FIG. 8, an example is given of the construction of the damping device 31 in the zone 30. A rail 38 is earthed through a resistor 37 and a contact (not shown) of the circuits of the rotor out along this rail 38 when they pass through the zone 30.

The same machine is capable of operating as a generator (FIGS. 6 and 9).

FIG. 6 represents a machine whose stator is connected as a high-pass filter: each pole winding is connected at one end to the common conductor 13 and at the other end to two capacitors 12, as shown in the Figure. The filter thus constituted has a phase velocity which varies very rapidly with the frequency and in the direction opposed to that of the flux of electrical energy (inverse wave). The rotor has a velocity rather close to that of the phase velocity whereas the energy flows back to the load 36 in the opposite direction. The upstream side (for the energy) of the filter terminates on the characteristic impedance 42 of the filter.

A generator is obtained in this way having a frequency which is determined within a wide band by the speed of rotation of the rotor. In the example shown in the Figure, the rotor has a squirrel-cage structure.

The machine of FIG. 9 differs from that of FIG. 6 by the addition of supplementary capacitors 120 arranged in parallel with the inductances 11. The circuit thus obtained is an inverse wave band-pass filter. The width of its band-pass is determined by the respective values of the capacitors 12 and 120.

The phase velocity remains rapidly variable as a function of the frequency. The machine operates as a generator the frequency of which depends only very slightly on the velocity of rotation of the rotor.

Of course, the invention is not limited to the embodiment described and shown which was given solely by way of example.

What is claimed is:

1. An improved electrical apparatus of the type that comprises:

a stator having n poles;

a rotor having n poles; and means for inducing relative motion between said stator and said rotor such that at least one of said stator poles is successively juxtaposed to n of said rotor poles, wherein the improvement comprises a plurality of electrical circuits associated with said stator and disposed to form a line having a pair of input terminals and a pair of output terminals; and a plurality of electrical circuits associated with said rotor, said circuits including radially connected resistive elements and being electrically coupled to the electrical circuits associated with said stator in the presence of said relative motion, wherein said stator and rotor are circular and disposed about a common axis, said relative motion comprises the rotation of said rotor about said common axis, the electrical circuits associated with said stator comprise a transmission line, including:

a plurality of inductors each at least partially associated with the corresponding stator pole, said inductors being serially connected between an input conductor located upstream of the direction of rotation of said rotor and an output conductor located downstream thereof and separated by a gap from said input conductor;

a common conductor;

a plurality of capacitors each having one plate connected to a tap on the corresponding inductor and the other plate connected to said common conductor; and at least two resistors each connected between an inductor and said common conductor to damp said line, the electrical circuits associated with said rotor comprises:

a plurality of inductors each at least partially associated with the corresponding rotor pole; and a corresponding plurality of said resistors each connected in parallel with a corresponding inductor and to a common point.

2. The improved apparatus according to claim 1 further comprising means, disposed in said gap, for damping said rotor circuits in the course of their passage between said input and output conductors.

3. An improved electrical apparatus of the type that comprises:
   a stator having n poles;
   a rotor having n poles; and
   means for inducing relative motion between said stator and said rotor such that at least one of said stator poles is successively juxtaposed to n of said rotor poles, wherein the improvement comprises
   a plurality of electrical circuits associated with said stator and disposed to form a line having a pair of input terminals and a pair of output terminals; and
   a plurality of electrical circuits associated with said rotor, said circuits including radially connected resistive elements and being electrically coupled to the electrical circuits associated with said stator in the presence of said relative motion, wherein said stator and rotor are circular and disposed about a common axis, said relative motion, the electrical circuits associated with said stator comprise a transmission line, including:
   a plurality of inductors each at least partially associated with the corresponding stator pole, said inductors being serially connected between an input conductor located upstream of the direction of motion of said rotor and an output conductor located downstream thereof and separated by a gap from said input conductor;
   a common conductor;
   a plurality of capacitors each having one plate connected to a tap on the corresponding inductor and the other plate connected to said common conductor; and
   at least two resistors each connected between an inductor and said common conductor to damp said line, the electrical circuits associated with said rotor comprises:
   a plurality of said resistors each connected at one end to a common conductor and at the other to a metal armature associated with the corresponding rotor pole, the corresponding stator pole also having a metal armature said electrical coupling comprising an electrostatic coupling.

4. The improved apparatus according to claim 3 comprising a further plurality of capacitors each connected between successive adjacent inductors of said plurality of inductors.

5. An improved electrical apparatus of the type that comprises:
   a stator having n poles;
   a rotor having n poles; and
   means for inducing relative motion between said stator and said rotor such that at least one of said stator poles is successively juxtaposed to n of said rotor poles, wherein the improvement comprises
   a plurality of electrical circuits associated with said stator and disposed to form a line having a pair of input terminals and a pair of output terminals; and
   a plurality of electrical circuits associated with said rotor, said circuits including radially connected resistive elements and being electrically coupled to the electrical circuits associated with said stator in the presence of said relative motion, wherein the electrical circuits associated with said stator comprise a transmission line, including:
   a plurality of inductors each at least partially associated with the corresponding stator pole, said inductors being serially connected between an input conductor located upstream of the direction of motion of said rotor and an output conductor located downstream thereof and separated by a gap from said input conductor;
   a common conductor;
   a plurality of capacitors each having one plate connected to a tap on the corresponding inductor and the other plate connected to said common conductor; and
   at least two resistors each connected between an inductor and said common conductor to damp said line, the electrical circuits associated with said rotor comprising:
   a plurality of inductors each at least partially associated with the corresponding rotor pole; and
   a corresponding plurality of said resistors each connected in parallel with a corresponding inductor and to a common point.

6. The improved apparatus according to claim 5 comprising a further plurality of capacitors each connected between successive adjacent inductors of said plurality of inductors.

* * * * *